(12) United States Patent
Lysen et al.

(10) Patent No.: US 6,337,742 B2
(45) Date of Patent: Jan. 8, 2002

(54) DEVICE FOR ASCERTAINING THE RELATIVE POSITION OF A REFERENCE AXIS OF AN OBJECT RELATIVE TO A REFERENCE BEAM, IN PARTICULAR A LASER BEAM

(75) Inventors: Heinrich Lysen, München; Dieter Busch, Ismaning, both of (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/840,168

(22) Filed: Apr. 24, 2001

Related U.S. Application Data

(62) Division of application No. 07/455,354, filed as application No. PCT/EP89/00476 on Apr. 28, 1989, now abandoned.

(30) Foreign Application Priority Data

Apr. 28, 1988 (DE) .......................................... 38 14 466

(51) Int. Cl.[7] .................................................. G01J 1/42
(52) U.S. Cl. ........................... 356/614; 356/3; 356/222; 250/208.2; 250/216
(58) Field of Search ........................... 365/3, 4.01, 614, 365/222; 250/208.2, 208.3, 216

(56) References Cited

U.S. PATENT DOCUMENTS

| | | |
|---|---|---|
| 3,562,537 A | 2/1971 | Miller |
| 3,816,000 A | 6/1974 | Fiedler |
| 4,277,169 A | 7/1981 | Krieg |
| 4,877,325 A | 10/1989 | Weule et al. |

FOREIGN PATENT DOCUMENTS

| | | |
|---|---|---|
| DE | 28 47 718 | 5/1979 |
| DE | 32 16 053 | 11/1983 |
| DE | 34 08 437 | 9/1985 |
| DE | 37 10 068 | 10/1987 |
| DE | 37 14 776 A1 | 11/1988 |
| JP | 60110741 | 6/1985 |
| JP | 60211310 | 10/1985 |
| JP | 60233154 | 11/1985 |
| JP | 61009476 | 1/1986 |
| JP | 6288904 | 4/1987 |
| JP | 62269010 | 11/1987 |

OTHER PUBLICATIONS

Optical Method of Measuring Angular Displacement When the Axis of Rotation Inclines, Sato et al., Applied Optics, Apr. 15, 1984, vol. 23, No. 8, pp. 1255–1257.

*Primary Examiner*—Frank G. Font
*Assistant Examiner*—Layla Lauchman
(74) *Attorney, Agent, or Firm*—Nixon Peabody LLP; David S. Safran

(57) ABSTRACT

A device is proposed, which makes it possible to ascertain the relative position of the reference axis BA of an object relative to a reference beam $R_p$ of an electro-magnetic radiation, in particular a laser beam. The device displays a spatially fixed radiation transmitter S and at the object end a splitting mirror 22 as well as two position detectors 23 and 25. The splitting mirror branches a partial beam $R_{p'}$ off from the reference beam. The reference beam passing rectilinearly through the splitting mirror impinges on the one position detector and the partial beam on the other. The position detectors supply electrical signals, from which the position of the reference axis is ascertainable by means of a computer. The known devices of this species have an appreciable space requirement. This defect is eliminated by particular structuring of the beam conduction and the additional use of special optical means. Beyond that, the measurement possibilities can be enlarged through additional emission of a second reference beam $R_s$.

2 Claims, 3 Drawing Sheets

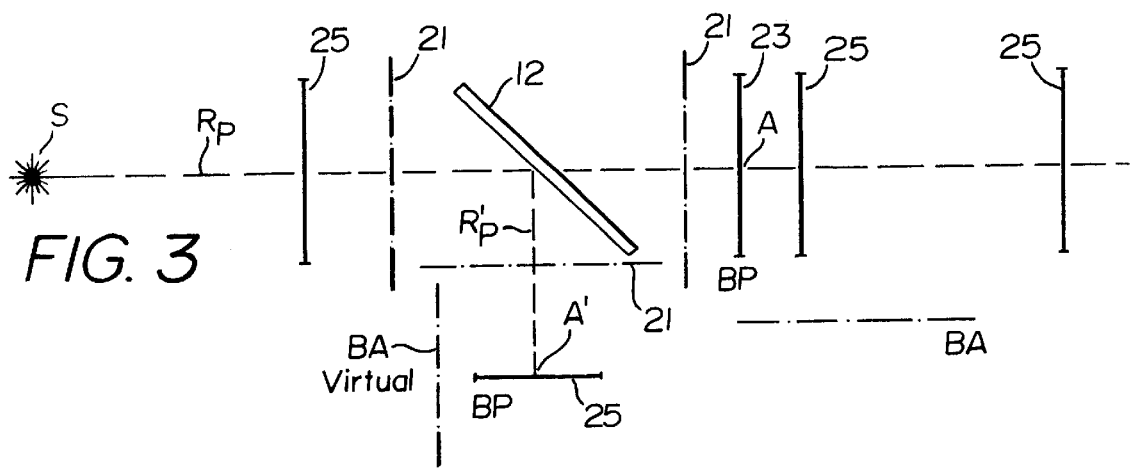
FIG. 3
FIG. 5
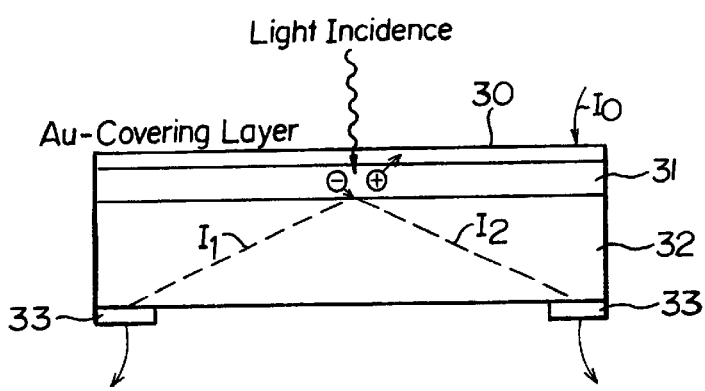
FIG. 6a

DEVICE FOR ASCERTAINING THE RELATIVE POSITION OF A REFERENCE AXIS OF AN OBJECT RELATIVE TO A REFERENCE BEAM, IN PARTICULAR A LASER BEAM

BACKGROUND OF THE INVENTION

This application is a Divisional of prior application Ser. No. 07/455,354, filed May 15, 1995 now abandoned, which is a 371 of PCT/EP89/00476, filed Apr. 28, 1989.

FIELD OF THE INVENTION

The present invention relates to a device for determining the relative position of a reference axis of an object with respect to a spatially fixed and substantially parallel focused reference beam of electromagnetic radiation, particularly a laser beam, directed thereto.

In the known devices of this kind, the partial beam is branched off at a right angle to the incident primary reference beam. In the known device, which is housed in the measuring head of an industrial robot for its laser-guided control (DE-A1 37 10 068), the position detector, onto which impinges the reference beam traversing the splitting mirror rectilinearly, serves the ascertaining of redispositions of the measuring head perpendicularly to the reference beam, whilst the other position detector, on which impinges the partial beam branched off at right angles, fulfills the purpose of delivering signals which are proportional to the rotation of the measuring head around the reference beam. An enlarging lens inserted into the beam path of the reference beam is so dimensioned that it effects an enlargement of the X direction and the Y direction on the first-mentioned position detector and the spacings of both the position detectors from the splitting mirror are arranged to be differently large, wherein the position detector hit by the reference beam is arranged near to the splitting mirror and the other position detector displays a substantially larger spacing herefrom perpendicularly to the reference beam. The consequence is that the known device displays a large space requirement in direction perpendicular to the laser beam.

The invention is based on the task of creating a device for determining the relative position of a reference axis of an object with respect to a spatially fixed and substantially parallel focused reference beam of electromagnetic radiation, particularly a laser beam, directed thereto, which has a substantially lower space requirement than the known devices and nevertheless displays a large effective length difference for the spacings between the measurement points on the measurement object so that it can be used with great resolving capability and great accuracy for the ascertaining of parallel displacements as well as also of angular displacements of the reference axis of the measurement object relative to the reference beam.

In the device according to the invention, an appreciably increased spacing is achieved geometrically between the measurement points at the object, namely the direct measurement point in the beam path of the reference beam and the virtual measurement point in the beam path of the partial beam, already with optimally small space requirement for the device due to the folding of the branched-off partial beam effected by the special kind of the twofold reflection of the same and this length difference is still enlarged optically by the dimensioning of the optical enlarging system especially adapted for this purpose.

A particularly compact and also interference-proof build-up of the device according to the invention is achieved by the convergent optical system being arranged in front of the splitting mirror in the beam path of the reference beam and by the convergent optical system being cemented together with the splitting mirror and the deflecting mirror as well as with the position detectors into a compact optical glass system, for which purpose the convergent optical system for the optical enlargement of the measurement point spacing is installed in the beam path at the entry side of the compact optical glass system, thus already in front of the splitting mirror.

Rotations of the device about the axis of the reference beam as well as the spacing of the device from the radiation transmitter can be detected in the device according to the invention by the fact that the radiation transmitter emits two reference beams, which between them include an acute angle, towards the object that both impinge on the position detectors. The separation of both the penetration points of both the reference beams impinging on each detector can on appropriate choice of the position detectors be left to them. It is however particularly advantageous so to equip the radiation transmitter that it emits both the reference beams in alternation so that simpler biaxial position detectors can be used.

The invention is explained still more closely in the following by an example of embodiment with reference to the drawing.

BRIEF DESCRIPTION OF THE DRAWINGS

FIGS. 1 to 3 schematic illustrations for explanation of the principle mode of operation of devices of the species forming the basis of the invention, FIG. 4 a perspective illustration for the explanation of the principle, which is usable alternatively in the device according to the invention, of a measurement with two reference beams, FIG. 5 in perspective illustration, a practical embodiment of the device according to the invention and FIGS. 6a to 6c a constructional form of a position detector usable in the device according to the invention.

DETAILED DESCRIPTION OF THE INVENTION

Figure 1:
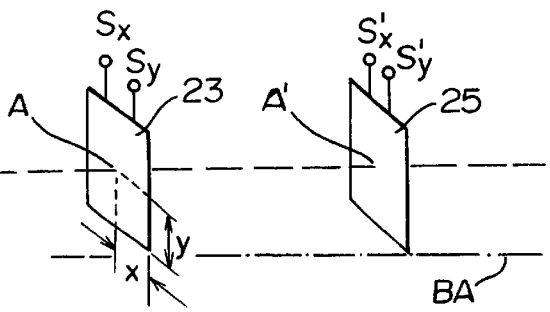
Figure 1:
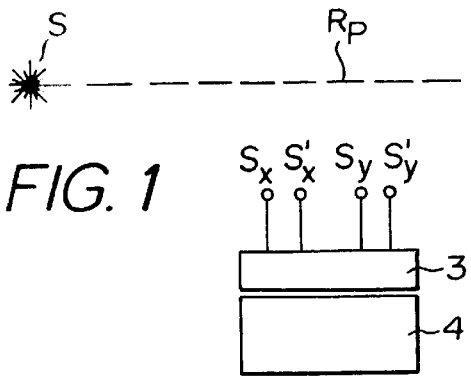

According to FIGS. 1 to 5, a spatially fixed radiation transmitter S emits a substantially parallelly focused primary reference beam $R_p$, preferably a laser beam, in such a direction that this impinges on two opto-electronic position detectors 23 and 25, which are arranged either physically or virtually at a spacing one behind the other and reproduced schematically in the drawing by rectangles. The position detectors are rigidly fastened at an object which displays a fixed reference axis BA, the position of which relative to the primary reference beam $R_p$ is to be ascertained in respect of parallel displacement and angular displacement and with the use of the two-beam principle according to FIG. 4—also in respect of its angular position around the primary reference beam $R_p$. The two-beam principle according to FIG. 4 moreover also still makes possible the ascertaining of the distance of the object from a fixed spatial point, for example the location of the radiation transmitter S.

The object, since its details do not matter, is represented in the drawing only by its reference axis BA.

The position detectors 23 and 25 are indicated schematically by rectangles in the drawing. They are represented physically one behind the other in FIGS. 1, 2 and 4 for the purpose of the explanation of the basic measurement principle. In the practical embodiments of the devices according to the species, they are however in reality disposed only virtually one behind the other, but not physically, as is evident in principle from FIG. 3.

Figure 2:
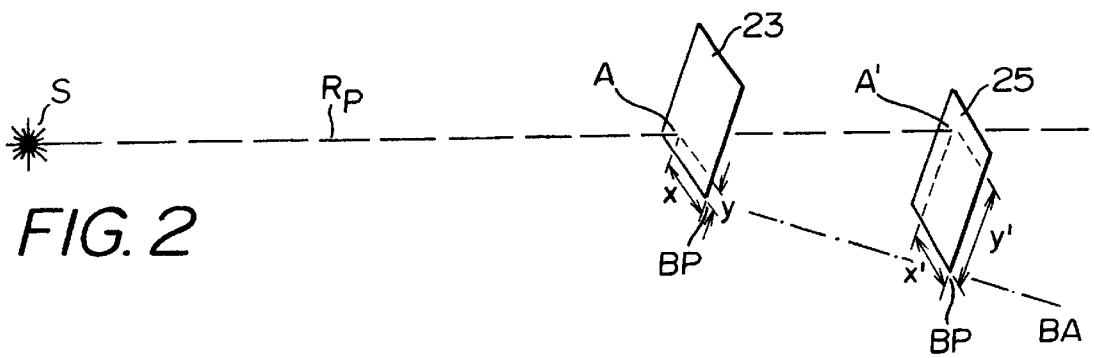

The position detectors 23 and 25 according to FIGS. 1 and 2 supply electrical signals which correspond to the magnitude and the sign of substantially mutually perpendicular coordinates x and y (detector 23) or x' and y' (detector 25), which are entered only in FIGS. 1 and 2, of the spacing which the respective point of incidence A and A' of the primary reference beam $R_p$ or a partial beam $R_{p'}$ (FIG. 3) branched off from this displays in the detector plane from a reference point BP in this. The position of the reference points BP in the detector plane is selectable arbitrarily according to practical measurement-technical premises, but fixed from the start and thus known. In the FIGS. 1 to 3 serving the explanation of the basic manner of function according to the species, the reference points BP each lie for the purpose of illustration at the lower front corner of the position detectors 23 and 25, while their connecting line coincides with the reference axis BA fixed by the object.

The position detectors 23 and 25 are so arranged at the object displaying the reference axis BA that their co-ordinate axes are aligned in the direction of projection of the primary reference beam $R_p$.

In the position of the reference axis BA to be seen in FIG. 1, the points of incidence A and A' of the primary reference beam $R_p$ on the position detectors 23 and 25 have the same spacing in magnitude and direction from the respective reference point BP so that also the coordinate x corresponds to the co-ordinate x' and the co-ordinate y corresponds to the coordinate y' and the detectors supply corresponding signals $S_x$, $S_{x'}$, $S_y$ and $S_{y'}$ by way of an appropriate signal converter 3 to the data processing equipment, for example, in the form of a commercially usual computer. From the signals according to parallel displacements in X and Y direction and according to yaw and pitch angular displacement, the computer computes, separately or according to other criteria, the relative position of the reference axis BA of the object relative to the primary reference beam $R_p$ as well as values for corrections which are to be undertaken at predetermined assembly points of the object for elimination of a displacement requiring correction.

The terminals $S_x$, $S_{y,Sx'}$ and $S_{y'}$ and as well as the computer 4 with its data converter 3 are indicated schematically only in FIG. 1, but are of course provided with the same intended purpose also in conjunction with the other figures.

The FIG. 2 by comparison with FIG. 1 shows a different relative position of the reference axis BA with respect to the primary reference beam $R_p$, which can have resulted through change in the position of the object in the measurement space for any reasons, for example, through operationally caused stresses of a machine forming the object. With the change in the position of the reference axis BA, the position of the position detectors 23 and 25 relative to the reference beam $R_p$ and thereby the position of the respective point of incidence on the detector plane have also changed. The positional change in FIG. 2 is predominantly a change in the angular position. Of course, a pure parallel displacement could also be concerned, thus a uniform change in spacing of the reference axis BA with respect to the primary reference beam $R_p$, or a combination of both kinds of displacement. It is also evident that angular changes in the plane of the drawing of the FIG. 2 as well as also perpendicularly thereto, thus a yaw angular displacement as well as also a pitch angular displacement, have the consequence of a change in the position of the point of incidence A or A' on at least one of both the position detectors. On a positional change of a point of incidence and due to the thereby consequent change in the coordinates x and y or x' and y', corresponding changes also result in the signals $S_x$ and $S_y$ or $S_{x'}$ and $S_{y'}$ which the computer in the case of the distance of the position detectors 1 and 2 from the radiation source S being known is capable of processing into a corresponding statement in respect of the position of the reference axis BA in the measurement space and corresponding correction values.

The arrangement of the position detectors 23 and 25 according to FIGS. 1 and 2 one physically behind the other would presuppose that the front position detector 23 for the primary reference beam $R_p$ is at least partially transparent. This is technically not to be realized simply at the present time. Therefore, in known devices according to the species as well as also in the device according to the invention according to FIGS. 3 and 5, customary light-impermeable position detectors 23 and 25 are used in conjunction with the merely virtual arrangement, still to be explained in the following by reference to the FIG. 3, of one of both the position detectors in the direction of projection of the primary reference beam $R_p$.

According to FIG. 3, the position detector 25 is arranged only virtually behind the position detector 23 in direction of the primary reference beam $R_p$, thereagainst physically outside the direction of projection emanating from the beam transmitter S. The position detector 23 has remained physically in the aforenamed direction of projection and, as in the scheme discussed in the preceding, arranged by its detector plane substantially perpendicular to the primary reference beam $R_p$, when the reference axis BA lies parallelly to this.

The position detector 25 is disposed at the object laterally beside the primary reference beam $R_p$, while its detector plane stands perpendicularly on that of the position detector 23 and is rotated relative to the position according to FIG. 1 about an axis perpendicular to the plane of the drawing of the FIG. 3. Before the reference beam $R_p$ has reached the position detector 23, it impinges on a beam splitter 22, which branches off from it a partial beam $R_{p'}$, which impinges perpendicularly on the detector plane of the position detector 25, when the reference axis BA lies parallelly to the reference beam $R_p$. The point of incidence A' of the reference beam $R_{p'}$. in a predetermined initial position of alignment corresponds in respect of its spacing from the reference point BP to the point of incidence of the reference beam $R_p$ on the position detector 23 so that the same conditions are present functionally as for the scheme according to FIG. 1.

Through the insertion of optical lenses 21 in front of the splitter mirror 22 and/or in front of the position detector 23 and/or in front of the position detector 25, any desired virtual arrangement of the position detector 25 can be achieved in the device according to the invention in the direction of projection of the primary reference beam R emanating from the radiation source S, thus either in front of or behind the position detector 23, for which three examples are indicated by dashed lines in FIG. 3.

Through appropriate structuring of the lenses 21, it is also possible to enlarge the detector planes seen from the radiation source S and thereby to obtain a measurement range matching.

In the case of the functional principles according to FIGS. 1 to 3, the knowledge—needed for the computer—of the distance of the position detectors 23 and 25 from the radiation source S is obtained in any manner independently of the measuring device.

Figure 4:
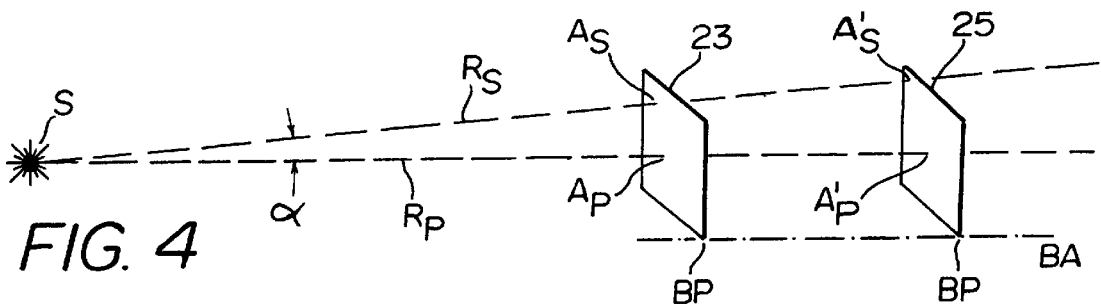

Thereagainst, the measurement principle, usable alternatively according to the invention and illustrated in FIG. 4, opens up the further possibility to obtain this knowledge by the same device, by which the parallel displacement and the yaw and pitch angular displacement are ascertainable. This is made possible according to FIG. 4 thereby, that a secondary reference beam $R_s$ is emitted by the radiation source S still in addition to the primary reference beam $R_p$ and at an acute angle hereto, wherein the angle and the direction of projection for both the reference beams are so chosen that both reference beams impinge on the detector plane of at least one of the position detectors 1 and 2 for all possible positions of the reference axis BA. It is evident that for a known angle α between both the reference beams, the respective spacing of both the points of incidence $A_s$ and $A_p$ or $A_{s'}$ and $A_{p'}$ in the one or other detector plane is a measure of the distance of the position detector 23 or 25 concerned from the radiation source S, thus the knowledge of this distance needed for the calculation can be obtained on the one hand and also changes in distance of the position detectors from the radiation source S are detectible on the other hand. Beyond that, the direction, which expresses itself in the co-ordinates x and y or x' and y' of each of both the points of incidence, of the spacing between the points of incidence in each detector plane also permits a statement about the angular position or the rotary angle of both the detectors rigidly coupled one with the other by way of the object—and thereby about the reference axis BP about the primary reference beam $R_p$ and thus also the detection of changes in this angular position.

The FIG. 5 shows schematically a practical embodiment of the device according to the invention, which operates on the principle of the virtual position detector alignment with optical influencing of the effective detector spacing according to FIG. 3 and operable selectably also on the two-beam principle according to FIG. 4 and which distinguishes itself by particularly small dimensions and nevertheless acts like a device which by comparison with it displays substantially larger detectors at a very great spacing relative to their actual dimensions and accordingly has a great measuring range with great angular measurement sensitivity.

In the device according to FIG. 5, a radiation transmitter S emits a primary reference beam $R_p$ and a secondary reference beam $R_s$. At the object end, the device displays a measurement part 20, which is rigidly fastenable at the object and into which both the reference beams $R_p$ and $R_s$ enter through a lens 21. In the measurement part 20, they impinge initially on the splitting mirror 22. This allows the reference beams $R_p$ and $R_s$ through rectilinearly to the first position detector 23, the detector plane of which is oriented substantially perpendicularly to the reference beam $R_p$.

The partial beams $R_{p'}$ and $R_{s'}$, which have been branched off from the incident reference beams $R_p$ and $R_s$ by the splitting mirror 22, are conducted to the second position detector 25, the detector plane of which lies in about the same plane as that of the first detector 23. To obtain a particularly large virtual spacing between the position detectors 23 and 25, the partial beams $R_p$ and $R_s$ are initially reflected by the splitting mirror 22 obliquely downwards in direction against the direction of incidence of the incident reference beams $R_p$ and $R_s$ and then once again at a customary deflecting mirror 24 in order geometrically prolonged to impinge only then on the position detector 25, the co-ordinate axes of which lie substantially parallelly to those of the position detector 23.

The lens 21 is so structured that the position detectors 23 and 25 seen from the radiation transmitter S come to appear as detectors 23' and 25', which are substantially enlarged compared with their actual dimensions on the one hand and arranged at substantially greater spacing one behind the other relative to the dimensions in the measurement part 22 on the other hand and onto which the reference beams $R_p$ and $R_s$ impinge directly in the direction of projection emanating from the radiation source S.

The individual components of the measurement part 20, i.e. the convergent optical system 21, the splitting mirror 22, the deflecting mirror 24 and the position detectors 23 and 25 are cemented together into a stable interference-proof compact optical glass system which in particular also excludes a condensation of water vapour at the optically active surfaces.

By the embodiment according to FIG. 5 and with dimensions in the order of magnitude of a cigarette carton or even smaller, the position of an object or of a fixed reference axis thereof relative to the reference beam $R_p$ can be determined with greatest precision and positional changes relative to an initial position can be ascertained separately in respect of the following components:

a) parallel displacement in all directions,
b) pitch angular displacement,
c) yaw angular displacement and
d) rotary angular displacement.

Beyond that, the distance of the detectors from the radiation source S and a displacement with respect thereto is also ascertainable by this device.

Since position detectors in the simple embodiment according to FIG. 6 would in undesired manner supply electrical output signals intermixed in each detector plane in respect of both the points of incidence $A_p$ and $A_s$, the radiation transmitter S on the use of such or similar detectors in the device according to FIG. 5 emits the reference beams $R_p$ and $R_s$ alternately in rapid sequence so that the co-ordinates of both the points of incidence arise one after the other in time and thereby separately as corresponding electrical signals.

Figure 6B:
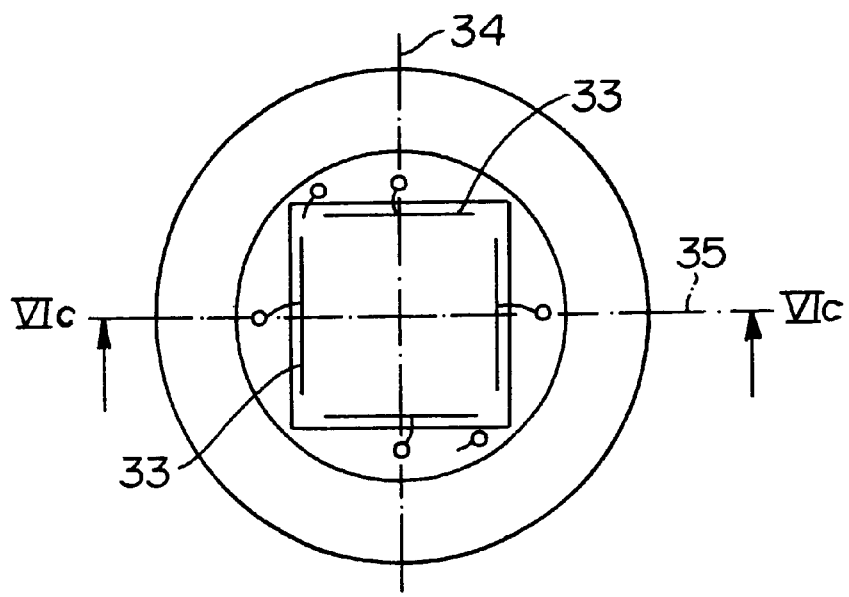
Figure 6C:
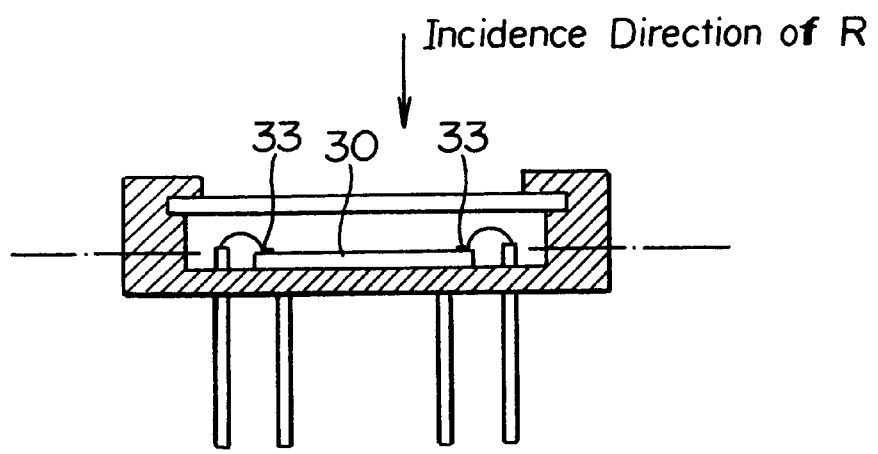

The FIGS. 6a to 6c serve the explanation of the basic manner of effect of a form of construction of an analog biaxial photo-electronic semiconductor position detector usable in the device according to the invention.

The position detector according to FIGS. 6a to 6c displays a covering layer 30 of gold, a depletion zone 31 thereunder and a high-resistance substrate 32 again thereunder, wherein a current $I_o$ is conducted to the gold covering layer 30 and contact strips 33 are arranged at the substrate laterally as well as at the top and bottom along the substantially square-substrate cross-section, by way of which contact strips the supplied current $I_o$ flows away divided up into partial currents. The division of the current $I_o$ is dependent on the point, at which a light beam impinges on the gold covering layer. In this illustrated form of construction, the supplied current $I_o$ is divided up into four partial currents which flow away by way of the individual contact strips 33 and in respect of their magnitude depend on the spacing which the point of incidence of the light beam has from the centre. When the beam thus impinges exactly in the centre of the square gold covering layer congruent with the depletion zone and the substrate, the four partial currents of each equally great one among the other. The rectangular components of the spacing of an eccentric point of incidence of the light beam from the co-ordinate centre can be read off from a possible current difference at the contact strips 33 lying oppositely in pairs one with respect to the other.

Position detectors of the aforedescribed kind are known apart from other basically suitable forms of construction and obtainable in commerce.

What is claimed is:

1. Device for determining the distance of an object using substantially parallel focused reference beams of electromagnetic radiation directed thereto, comprising:
   a) a radiation transmitter for emitting of a pair of substantially parallel focused reference beams of electromagnetic radiation at a predetermined acute angle relative to each other;
   b) a position detecting unit which is fastenable to the object, said position detecting unit having first and second biaxial opto-electronic position detectors which are arranged at approximately the same height relative to said pair of reference beams in mutually parallel planes which are at different distances from the transmitter in a direction of emission of said pair of reference beams, and each of which emits electrical signals representative of mutually perpendicular, translational position coordinates, in magnitude and sign, of a point of incidence of each of said pair of reference beams on the respective position detector;
   c) an electronic processing unit connected to each of said opto-electronic position detectors, and having means for computing the distance between the object and the transmitter from the electrical signals emitted by the position detectors and the angle between said pair of reference beams;
   d) a splitting mirror arranged in a linear beam path of each of said pair of reference beams from the transmitter to the first opto-electronic position detector for splitting each of said reference beams, permitting a first portion of each of said reference beams to pass to the first opto-electronic position detector and diverting a second portion of each of said reference beams in a direction obliquely opposite to a direction of linear beam path, which is from said transmitter to said splitting mirror, to a deflecting mirror for deflecting the second portion of each of said reference beams to said second opto-electronic position detector along a longer path than that of the first portion of each of said reference beams between the splitting mirror and the first opto-electronic position detector.

2. The device according to claim 1, wherein the radiation transmitter has means for emitting a second reference beam toward said splitting mirror, said detecting mirror and said enlarging optical system at an acute angle relative to said first reference beam, the position detectors being in the path of said first and second said reference beams.

* * * * *